United States Patent
Lecoq

(10) Patent No.: US 9,841,575 B2
(45) Date of Patent: Dec. 12, 2017

(54) OPTICAL ENCLOSURE WITH PRE-CONNECTED CABLE REEL

(71) Applicant: ORANGE, Paris (FR)

(72) Inventor: Daniel Lecoq, Berhet (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/129,711

(22) PCT Filed: Mar. 23, 2015

(86) PCT No.: PCT/FR2015/050726
§ 371 (c)(1),
(2) Date: Sep. 27, 2016

(87) PCT Pub. No.: WO2015/145055
PCT Pub. Date: Oct. 1, 2015

(65) Prior Publication Data
US 2017/0139169 A1     May 18, 2017

(30) Foreign Application Priority Data
Mar. 27, 2014 (FR) ...................................... 14 52674

(51) Int. Cl.
*G02B 6/44* (2006.01)
*G02B 6/38* (2006.01)

(52) U.S. Cl.
CPC ......... *G02B 6/4457* (2013.01); *G02B 6/3897* (2013.01); *G02B 6/4446* (2013.01)

(58) Field of Classification Search
CPC .................................................... G02B 6/4457
See application file for complete search history.

(56) References Cited

U.S. PATENT DOCUMENTS

| 8,254,740 B2* | 8/2012 | Smith ................ G02B 6/3897 |
| | | 385/135 |
| 9,563,031 B2* | 2/2017 | Loeffelholz .......... G02B 6/4453 |
| 9,632,273 B2* | 4/2017 | Smith ................ G02B 6/4457 |
| 2009/0074370 A1 | 3/2009 | Kowalczyk et al. |

(Continued)

OTHER PUBLICATIONS

Written Opinion of the International Searching Authority dated Jun. 11, 2015, for corresponding International application No. PCT/FR2015050726, filed Mar. 23, 2015.

(Continued)

*Primary Examiner* — Michelle R Connelly
(74) *Attorney, Agent, or Firm* — David D. Brush; Westman Champlin & Koehler, P.A.

(57) ABSTRACT

An optical port including: a base capable of being attached substantially parallel to a planar surface; a spool arranged so as to rotate about a shaft, which is substantially perpendicular to the base; an optical cable rolled up into the spool; and a connector. An inner side of the connector is connected inside the port to a first end, referred to as the "inner end", of the cable. An outer side of the connector is intended to be connected to an outer optical connection plug. The cable is intended to be unreeled out from the port by pulling one second end, referred to as the "outer end", of the cable. The pulling rotates the spool on the shaft. The connector is secured to the spool and arranged so as to take at least one position outside the radial configuration of the spool.

10 Claims, 4 Drawing Sheets

(56) References Cited

U.S. PATENT DOCUMENTS

Figure 1:
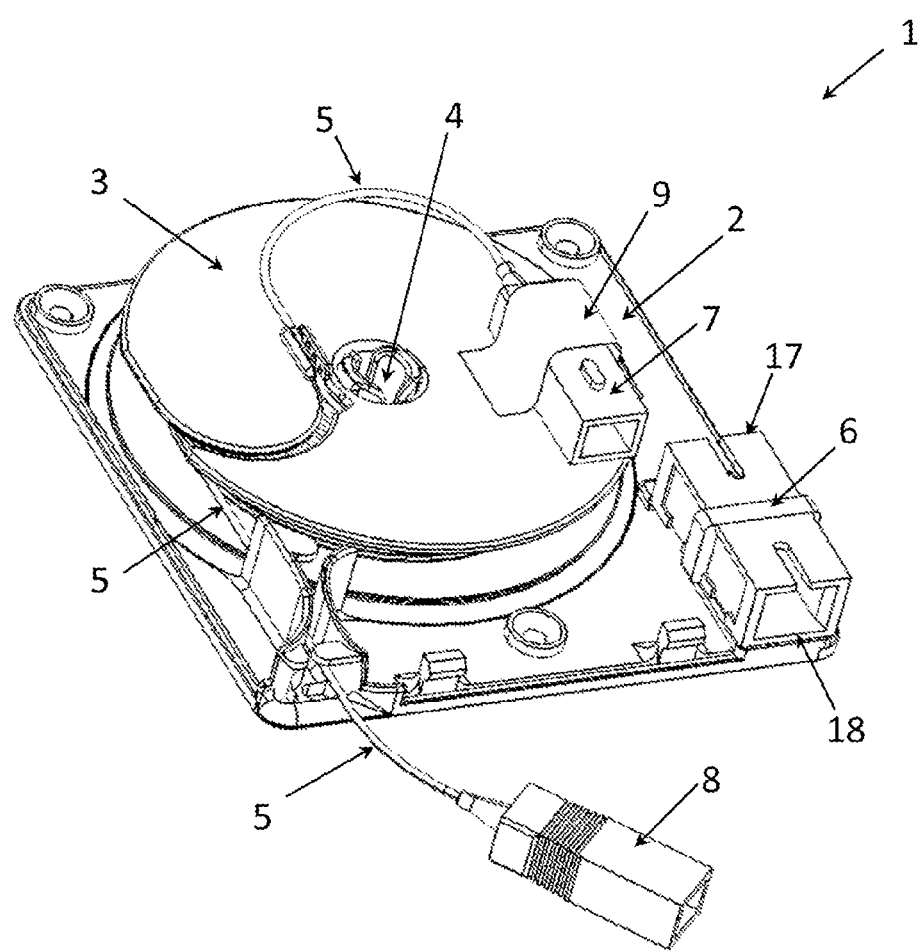

| | | | |
|---|---|---|---|
| 2013/0209049 A1* | 8/2013 | Kowalczyk | G02B 6/4457 385/135 |
| 2014/0010512 A1* | 1/2014 | Kowalczyk | G02B 6/4441 385/135 |
| 2015/0063770 A1* | 3/2015 | Kowalczyk | G02B 6/4446 385/135 |
| 2015/0093088 A1* | 4/2015 | Matz | G02B 6/4446 385/135 |
| 2015/0355428 A1* | 12/2015 | Leeman | G02B 6/4455 385/135 |
| 2016/0187607 A1* | 6/2016 | Kowalczyk | G02B 6/4441 385/135 |
| 2017/0045699 A1* | 2/2017 | Coan | G02B 6/445 |

OTHER PUBLICATIONS

International Search Report dated Jun. 11, 2015, for corresponding International Application No. PCT/FR2015/050726, filed Mar. 23, 2015.

International Preliminary Report on Patentability and English translation of the Written Opinion of the International Searching Authority dated Sep. 27, 2016, for corresponding International application No. PCT/FR2015050726, filed Mar. 23, 2015.

* cited by examiner

OPTICAL ENCLOSURE WITH PRE-CONNECTED CABLE REEL

CROSS-REFERENCE TO RELATED APPLICATIONS

This Application is a Section 371 National Stage Application of International Application No. PCT/FR2015/050726, filed Mar. 23, 2015, the content of which is incorporated herein by reference in its entirety, and published as WO 2015/145055 on Oct. 1, 2015, not in English.

1. FIELD OF THE INVENTION

The invention application is within the field of connecting optical fiber at the premises of the subscribers to electronic communication services, and more particularly to the installation of the optical enclosure intended to connect the optical network terminal of the subscriber.

2. PRIOR ART

Within the context of the FTTH (Fiber To The Home) deployment, an optical cable provides the connection between, firstly, the entry of the optical fiber into the serviced apartment, and, secondly, the optical terminal of the subscriber per se, also known by the name ONT (Optical Network Terminal) or ONU (Optical Network Unit). At the entry into the apartment, the enclosure is called IOTB, meaning interior optical termination box, and at the ONT connection, the enclosure is called OTE, meaning optical terminal enclosure. The cable is generally provided at each of the ends thereof with a SC/APC ("Subscriber Connector/Angled Physical Contact polish") type connector.

The invention relates to the OTE enclosure, and unless otherwise indicated the terms "enclosure" or "optical enclosure" will designate this enclosure hereafter.

Lastly, such an enclosure comprises a pre-wound length of cable, and has multiple constraints. The enclosure should contain a sufficient length of optical cable, which length is suitable for the majority of apartments, while remaining discreet and with limited spatial requirement. Before, during and after the installation operations, the bending radius of the cable should never be less than a breakage threshold for the fiber contained in the cable. Furthermore, it should be possible for a person who is not an optical fiber specialist to install the enclosure, and within a limited time.

An optical enclosure is known which comprises, already wound in a spool, an optical cable with a diameter of 900 µm and a length of 25 to 40 m according to the enclosure model used to cover the distance between the entry of an apartment and the room where the enclosure should be installed. A connection plug is connected to each end of the cable. The plug at the end remaining in the enclosure, called the internal end, can be connected to the inner side of a connecting piece in the enclosure, and the plug at the other end, called the external end, can be connected to another optical enclosure, for example the IOTB enclosure. The outer side of the connecting piece in the enclosure is for its part intended to receive the connection plug of the ONT. The enclosure is firstly fixed at the final location thereof, for example on a wall of the living room close to the ONT. Then, the cable length necessary for reaching the IOTB enclosure in the entry is unwound by the installer by pulling the external end out of the enclosure which then serves as a reel. The unwound cable is, for example, stuck along the baseboards or along the corners between walls and ceilings, generally from the entry towards the living room. Possibly, the length which has been excessively unwound after the cable has been installed must be wound again inside the enclosure. Generally, after installation there remains an unused cable excess length, wound in the spool of the enclosure.

Pulling the cable out of the enclosure causes the spool to rotate. During this rotation, the plug of the internal end of the cable cannot be connected to the connecting piece since this would block the rotation. This internal end must, therefore, be attached to the spool in order to prevent any friction, tangling or hooking that can damage the plug, the cable or any other part of the enclosure, when the internal end rotates with the spool. The installer uses, for example, a piece of adhesive tape to temporarily attach the plug of the internal end of the cable to the spool, at a location of the spool where the end of the cable which juts out does not hinder the rotation.

Once the desired length of cable has been unwound, the installer must grasp the plug of the internal end, detach it from the spool and connect it to the inner side of the connecting piece of the enclosure, which firstly involves additional risks of damaging the cable and the plug, and secondly is a delicate operation that is time-consuming for the installer.

One of the aims of the invention is to overcome these disadvantages of the prior art.

3. DISCLOSURE OF THE INVENTION

The invention improves the situation using an optical enclosure comprising:
  a base that can be fixed substantially parallel with a planar surface,
  a spool arranged to rotate about a shaft which is substantially perpendicular to the base,
  an optical cable wound in the spool,
  a connecting piece, an inner side of which is connected inside the enclosure to a first end of the cable, called the internal end of the cable, an outer side of the connecting piece being intended to be connected to an external optical connection plug,
the cable being intended to be unwound out of the enclosure by pulling a second end of the cable, called the external end of the cable, the pulling causing the spool to rotate on the shaft, the connecting piece being rigidly connected to the spool, and arranged to assume at least a position outside the radial continuation of the spool.

When the cable is pulled out of the enclosure by the external end thereof, the internal end of the cable, which remains in the spool, rotates with the spool. As, according to the invention, the connecting piece is rigidly connected to the spool, the connecting piece and the spool follow exactly the same rotation movements when the cable is pulled. Moreover, as the connecting piece assumes a position outside the radial continuation of the spool, it is not an obstacle to the cable being unwound. This position outside the radial continuation of the spool is, for example, on a free face of the spool. Thanks to the invention, it is therefore possible to connect, in advance, the internal end of the cable to the connecting piece of the enclosure, which avoids this delicate operation for the installer. The internal end of the cable can come out of the spool via a slot arranged on the free face of the spool, which is open at the perimeter of the free face of the spool. For connecting to the connecting piece, the end is, for example, provided with a SC/APC type plug.

Advantageously, the optical enclosure can, therefore, be delivered with the internal end of the cable pre-connected to the connecting piece of the enclosure. Not only are the risks of damaging the enclosure and the elements thereof eliminated, but there is a saving in time for the enclosure installation operation.

According to an aspect of the invention, the spool comprises a movable part on which the connecting piece is fixed, which movable part is arranged to tilt the connecting piece between at least a position outside the radial continuation of the spool, and a storage position in the radial continuation.

Since the enclosure is intended to be fixed to a wall, it is desirable to limit the total thickness thereof in order to reduce as much as possible the spatial requirement thereof and make it as discreet as possible. When the spool rotates, in order to not block the unwinding of the cable, no element which is rigidly connected to the spool must be located in the radial continuation thereof. The connecting piece must therefore be located away from the radial continuation of the spool during the rotation thereof. Thanks to the movable part on which the connecting piece is fixed, it is nevertheless possible to position the connecting piece in a storage position in the radial continuation of the spool, for example when the spool does not rotate.

Advantageously, when the connecting piece is in this position, the connecting piece and the spool can be arranged beside one another in the base of the enclosure. The total thickness of the enclosure is, therefore, reduced since it is a function of either the axial height of the spool or of the height of the connecting piece, but not of the sum of the two.

This is all the more advantageous if the external optical connection plug can be connected to the outer side of the connecting piece in this storage position, and as this storage position is also the final position of use of the connecting piece.

According to an aspect of the invention, the movable part is a flap connected by a hinge to the spool.

Thanks to the flap connected by a hinge to the spool, it is sufficient to immobilize the connecting piece in order to immobilize the flap, and therefore to immobilize the spool, since the rigidity of the flap and of the hinge prevents any movement of the spool with respect to the flap. Advantageously, when the connecting piece is immobilized in the storage position thereof, the unwound cable excess length is therefore kept inside the spool since the rotation thereof is blocked.

According to an aspect of the invention, as an alternative to the flap and to the hinge, the movable part is a flexible strip having one end fixed to the spool.

Thanks to the flexible strip, the same advantages as those of the flap and the hinge are obtained, furthermore with the advantage of avoiding the use of the hinge, which makes the enclosure easier and less expensive to manufacture. The strip is fixed on the top of the spool parallel therewith, for example via one or more spots of glue at a first end, and the second end thereof, to which the connecting piece is fixed, juts out from the radial edge of the spool. The strip is made from a material that is solid but flexible and elastic in the bending direction, such that it is possible to fold, onto the top of the spool, the second end thereof with the connecting piece. During the rotation of the spool, the connecting piece is held against the spool by a temporary attachment means. Therefore, when the spool rotates, the connecting piece is not positioned in an untimely manner in the radial continuation of the spool and therefore does not hinder the unwinding of the cable. If the connecting piece is not held on the top of the spool, the elasticity of the strip places the connecting piece back in the storage position.

According to an aspect of the invention, the enclosure further comprises blocking means that can immobilize the connecting piece, when the connecting piece is in the position outside the radial continuation of the spool.

Thanks to this aspect, when the spool rotates, the connecting piece is not positioned in an untimely manner in the radial continuation of the spool and, therefore, does not hinder the unwinding of the cable.

According to an aspect of the invention, the enclosure further comprises blocking means that can immobilize the connecting piece, when the connecting piece is in the storage position.

Thanks to this aspect, the connecting piece is stabilized in order to resist the pushing force exerted by the insertion of a connection plug from the exterior of the enclosure, or the pulling force exerted by pulling it out. Moreover, the spool is immobilized since the connecting piece is rigidly connected to the spool, and this prevents any unwound cable excess length from exiting the enclosure in an untimely manner.

According to an aspect of the invention, the blocking means comprise at least one abutment in the base, which can block the connecting piece in the storage position.

Such an abutment is simple to manufacture, and no complex operation of blocking the constituent elements of the enclosure is required by the installer.

According to an aspect of the invention, the enclosure further comprises a removable lid that can cover the base and the spool, and the blocking means comprise at least one abutment in the lid, blocking the connecting piece in the storage position when the lid covers the base.

Such an abutment is simple to manufacture, and no complex operation for blocking of constituent elements of the enclosure is required by the installer. This abutment can quite simply be a part of the edge perpendicular to the top of the lid, against which the connecting piece can press.

Moreover, the internal face of the top of the lid presses the connecting piece against the base, and prevents any movement of the connecting piece in planes that are perpendicular to the rotation plane of the spool. Therefore, the connecting piece and the spool are completely immobilized when the lid covers the base.

According to an aspect of the invention, the section of the cable is circular, oval or rectangular.

The enclosure according to the invention is also suitable for cables which not only have a circular section, but also cables having a flattened section such as ribbon-shaped cables, oval or rectangular section cables.

The various aspects of the optical enclosure which have just been described can be implemented independently of each other or in combination with each other.

The invention also relates to a method of installing an optical enclosure, the enclosure comprising:
  a base that can be fixed substantially parallel with a planar surface,
  a spool arranged to rotate about a shaft which is substantially perpendicular to the base,
  an optical cable wound in the spool,
  a connecting piece, an inner side of which is connected, inside the enclosure, to a first end of the cable, called the internal end of the cable, an outer side of the connecting piece being intended to be connected to an external optical connection plug,
the cable being intended to be unwound out of the enclosure by pulling a second end of the cable, called the external end of the cable, the pulling causing the spool to rotate on the shaft, the method comprising the following steps:

fixing the base on the planar surface,
positioning the connecting piece in a position outside the radial continuation of the spool,
unwinding a length of cable by pulling the cable out of the enclosure by the external end of the cable,
positioning the connecting piece in a storage position in the radial continuation of the spool,
fixing a lid on the base.

The method of installing an optical enclosure according to the invention differs from past practice since it does not require a step of connecting the internal end of the cable to the connecting piece after the step of unwinding a cable length out of the enclosure. Thanks to the enclosure according to the invention, this delicate operation is no longer necessary since the internal end of the cable is pre-connected to the connecting piece. It is sufficient for the installer to position the connecting piece outside of the radial continuation of the spool before making the latter rotate by pulling on the external end, then, after unwinding the cable, for the installer to position the connecting piece in the final storage position. The installer no longer needs to touch the internal end of the cable, which eliminates the risks of damaging the cable and the connection thereof and saves time.

4. PRESENTATION OF THE FIGURES

Figure 2:
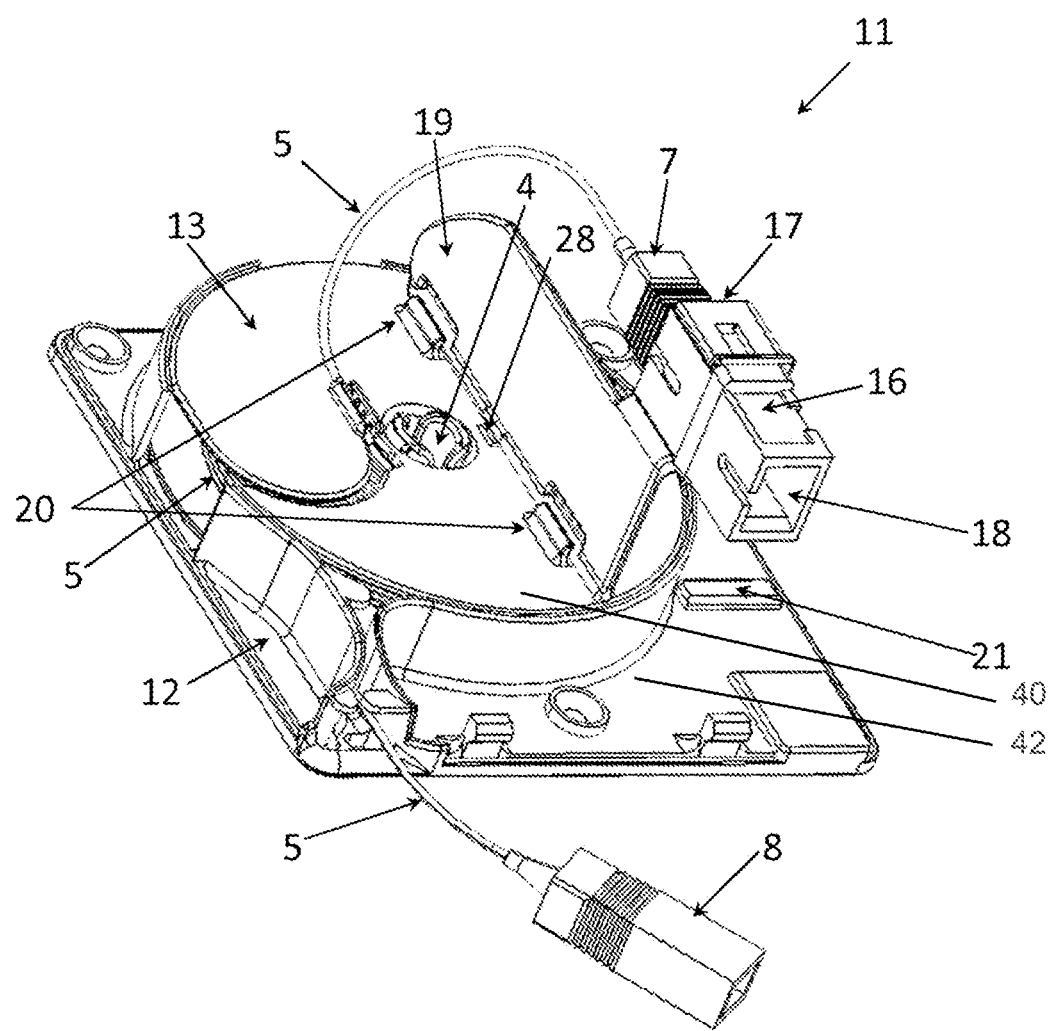
Figure 3:
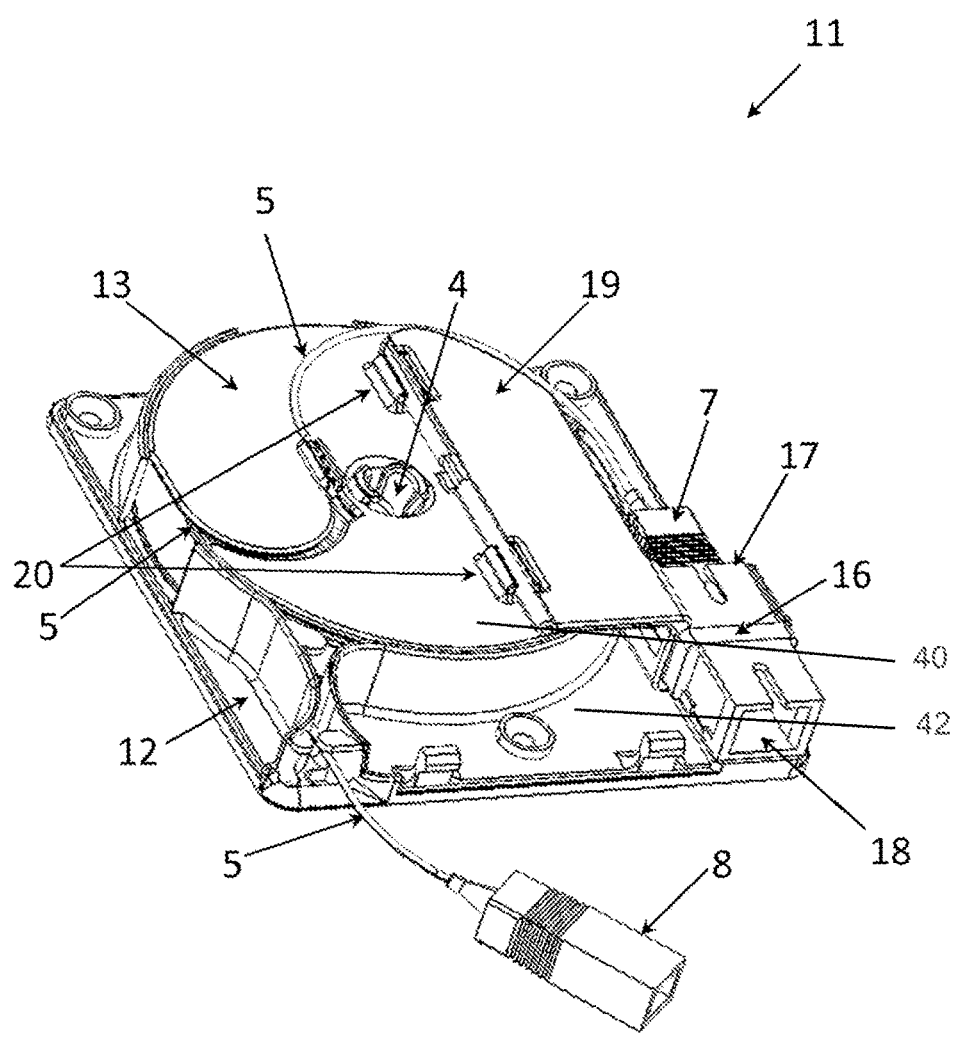
Figure 4:
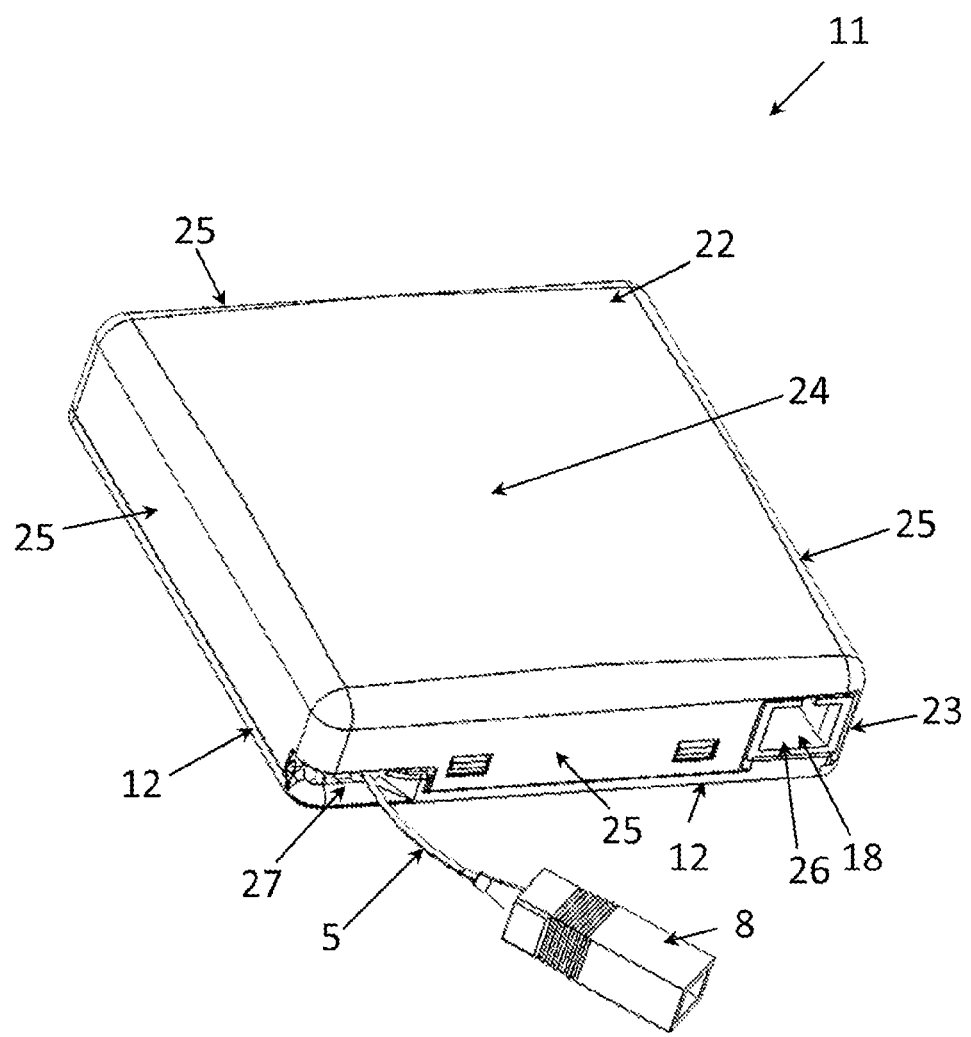

Other advantages and features of the invention will appear more clearly upon reading the following description of a particular embodiment of the invention, which embodiment is given as an illustrative and nonlimiting simple example, and the appended drawings, wherein:

FIG. 1 shows a perspective view of an optical enclosure according to the prior art, FIG. 2 shows a perspective view of an exemplary optical enclosure, according to an embodiment of the invention, in a position where there is free rotation of the spool, FIG. 3 shows a perspective view of the optical enclosure of FIG. 2, in a position where the rotation of the spool is blocked, FIG. 4 shows a perspective view of the optical enclosure of FIG. 2, covered with the lid thereof.

5. DETAILED DESCRIPTION OF A LEAST ONE EMBODIMENT OF THE INVENTION

The remainder of the description presents an exemplary embodiment of the invention based on an OTE enclosure using an optical cable with a circular section with a diameter of 900 µm and AS/APC type connector plugs, but the invention also applies to other types of optical enclosure, cable and connection, such as for example an IOTB enclosure, or a noncircular section cable.

FIG. 1 shows an optical enclosure according to the prior art.

Such an optical enclosure 1 corresponds to the preamble of the main claim and comprises:
- a base 2 that can be fixed substantially parallel with a planar surface,
- a spool 3 arranged to rotate about a shaft 4 which is substantially perpendicular to the base,
- an optical cable 5 wound in the spool 3,
- a connecting piece 6, an inner side 17 of which is intended to be connected inside the enclosure 1 to a first end 7 of the cable 5, called the internal end of the cable, and an outer side 18 of which is intended to be connected to an external optical connection plug which is not illustrated,
- the cable 5 being intended to be unwound out of the enclosure 1 by pulling a second end 8 of the cable, called the external end of the cable, the pulling causing the spool 3 to rotate on the shaft 4.

A major disadvantage of such an enclosure is that the internal end 7 of the cable 5 must be disconnected from the connecting piece 6 when the cable 5 is unwound since the unwinding causes the spool 3 to rotate which would be impossible if the internal end 7 remained connected to the connecting piece 6 which is fixed to the base 2. The internal end 7, which has become free, must therefore be temporarily attached to a part of the spool 3, such that no obstacle hinders the rotation and damages the cable 5, or other elements of the enclosure 1. A simple way of achieving this temporary attachment is via an adhesive tape 9. There are also more reliable temporary attachment means, which are however more complex, such as, for example, a housing (not illustrated) in a part of the spool 3 specially provided for receiving the internal end 7 when it is not connected to the connecting piece 6.

Once the step of unwinding the cable 5 is complete, the internal end 7 of the cable 5 must be detached from the spool 3 and connected to the connecting piece 6, which is also a major disadvantage, due to the risk of damaging the cable and the connection thereof at each handling operation, without taking into account the time required for this operation.

FIG. 2 shows an exemplary embodiment of an optical enclosure according to the invention, in a position where there is free rotation of the spool.

The optical enclosure 11 according to this embodiment of the invention is characterized in that it comprises, in addition to the features of the optical enclosure according to the prior art, a flap 19 connected to the spool 13 by one or more hinges 20 located on the upper face of the spool 13.

The spool 13 extends radially from the shaft 4 between a first plane 40 and a second plane 44. The connecting piece 16 and the base 12 also differ from the prior art in that the connecting piece is no longer fixed to the base, but to the flap 19. This flap can assume several positions, including for example a position that is substantially perpendicular to the spool 13 and to the base 12, as illustrated by FIG. 2, wherein the connecting piece 16 is outside the radial continuation of the spool 13, defined between the first and second planes 40 and 42. The flap 19 can be held in this position, for example, using a notch 28 in the pivoting axis of the hinge 20. Therefore, when the flap 19 and the connecting piece 16 are in this position, even if the internal end 7 of the cable 5 is connected to the connecting piece 16, the rotation of the spool 13, and therefore the unwinding of the cable 5 out of the enclosure 11 by pulling the external end 8 thereof, are not hindered in any way.

Thanks to the flap 19 of the enclosure 11 according to the invention, it is therefore possible to pre-connect the internal end 7 of the cable to the connecting piece 16, therefore preventing the installer of the enclosure from having to do this.

The hinge(s) 20 can optionally be flexible hinges. A flexible hinge allows the flap 19 and the top of the spool 13 to be molded as a single piece, which has the advantage of making the enclosure 11 more simple and less expensive to manufacture.

FIG. 3 shows the optical enclosure of FIG. 2, in a position where the rotation of the spool is blocked.

It is understood that, when there is free rotation of the spool 13, the connecting piece 16 is not in the final usage position thereof, called the storage position.

The flap 19 can also assume a position placing the connecting piece 16 in the storage position, where the rotation of the spool 13 is blocked. Indeed, when the flap 19 is folded towards the base 12, the spool 13 is orientated such that the connecting piece 16 is positioned exactly against an abutment 21 (visible in FIG. 2, hidden by the connecting piece 16 in FIG. 3) provided in the base 12, next to the spool 13. In this storage position, the connecting piece 16 is in the radial continuation of the spool 13, between the first and second planes 40 and 42. The arrangement of the connecting piece 16 in the storage position with the abutment 21 produces at least three advantageous effects:

- the rotation of the spool 13 is blocked by the assembly formed by the abutment 21, the connecting piece 16, the flap 19 and the hinge 20, and the unwound cable 5 therefore remains in the spool 13,
- the connecting piece 16 remains in place even when a pushing force is exerted thereon towards the inside of the enclosure 11, for example when an external connection plug is inserted therein via the outer side 18 of the connecting piece 16,
- the thickness of the enclosure 11 with respect to the wall is minimized since the connecting piece 16 is next to the spool 13, and not on one of the faces of the spool 13, which reduces the spatial requirement of the enclosure 11 and makes it more discreet.

FIG. 4 shows the optical enclosure of FIG. 2, covered with the lid thereof.

The substantially flat shape of the enclosure 11 allows the fitting of a lid 22 which is removable and has a simple shape. When it is put in place, this lid 22 covers the base 12, the spool 13, the connecting piece 16 and the flap 19, when the connecting piece 16 is in the storage position, and therefore both protects the elements of the enclosure 11 from impact and conceals them from view. It is made up of a plate 24, the contour of which matches that of the base 12, which is for example rectangular, and of an edge 25 on the perimeter of the plate 24 and substantially perpendicular thereto, with a height corresponding to the thickness of the enclosure 11 between the base 12 and the flap 19. Arranged in the edge 25 are at least two openings 26 and 27: a first opening 26 for the external connection plug, and a second opening 27 for the part of the cable 5 unwound out of the enclosure.

An important feature of the lid 22 is that it can comprise one or more abutments 23 preventing any movement of the connecting piece 16 in the rotation plane of the spool 13, one of which can be placed symmetrically with the abutment 21 of the base, or even replace the abutment 21, and another is a part of the edge 25 with which the connecting piece 16 is in contact when the lid 22 is put in place. This arrangement produces the same advantageous effects mentioned above, i.e.: the spool 13 blocked and the connecting piece 16 resisting a pushing force towards the inside of the enclosure 11.

Moreover, the lid 22, when put in place, is in contact with the flap 19 and prevents the latter from leaving the storage position, which results in increasing the solidity and the stability of the enclosure 11 according to the invention.

The lid 22 can be locked on the base 12 using any known closing system.

In an alternative embodiment (not illustrated), the flap 19 and the hinge 20 can be replaced by a thin strip which is solid but bendable, at least partially covering both the spool 13 and the connecting piece 16 when it is in the storage position. This strip is fixed both to the spool 13 and to the connecting piece 16, for example by glue spots, or by any other compact fixing means. The flexibility of the strip allows the connecting piece 16 to be removed from the storage position thereof without tearing the strip from the spool 13, and to be brought back towards the upper face of the spool 13. The middle part of the strip then serves as a flexible hinge. In this position, there is free rotation of the spool 13. The spool 13 can comprise a hook or any other known means of temporary attachment in order to hold the connecting piece 16 and prevent it from assuming once more, in an untimely manner, the storage position thereof during the rotation of the spool 13. When the connecting piece 16 is not held against the spool 13, the elasticity of the strip brings it back against the base 12 and holds it in the storage position, which is particularly useful when the lid 22 is not yet in place.

The strip has the advantage over the flap 19 of possibly being even thinner and of further reducing the spatial requirement of the enclosure 11.

The flap 19 has the advantage over the strip of being more solid and more rigid.

Such an enclosure according to this embodiment of the invention can house up to 28 m of cable with a 900 μm diameter, wound in the spool, and can fit into a parallelepiped having the internal dimensions 80 mm×80 mm×20 mm, with the lid put in place. The external dimensions of such an enclosure correspond to the majority of the wall electrical enclosures used in the interior fitting of dwellings. Advantageously, the enclosure is therefore consistent with the existing standards for construction, and it is possible to use existing accessories such as, for example, enclosure covers or installation tools.

The exemplary embodiments of the invention which have been presented above are only some of the embodiments that can be envisaged. They show that the invention allows an optical enclosure to be produced with the internal end of the cable pre-connected and with the possibility of remaining connected during the unwinding of the cable out of the enclosure, while simplifying the method of installing the enclosure.

The invention claimed is:

1. An optical enclosure comprising:
   a base that can be fixed substantially parallel with a planar surface;
   a spool arranged to rotate about a shaft which is substantially perpendicular to the base, the spool extending radially from the shaft between a first plane and a second plane;
   an optical cable wound in the spool;
   a connecting piece, an inner side of which is connected inside the enclosure to a first end of the cable, called the internal end of the cable, an outer side of the connecting piece being intended to be connected to an external optical connection plug;
   a removable lid that can cover the base and the spool;
   the spool being rotatable on the shaft to enable the cable to be unwound out of the enclosure by pulling a second end of the cable, called the external end of the cable,
   wherein the connecting piece is connected to the spool, and is movable between at least:
   a position outside a radial continuation of the spool defined between the first and second planes; and
   a so-called storage position within the radial continuation of the spool, between the first and second planes, the storage position allowing the lid to cover the base and the spool.

2. The optical enclosure as claimed in claim 1, wherein the spool comprises a movable part on which the connecting piece is fixed, wherein the movable part is arranged to tilt the connecting piece between at least a position outside the radial continuation of the spool, and a storage position in the radial continuation.

3. The optical enclosure as claimed in claim 2, wherein the movable part is a flap connected by a hinge to the spool.

4. The optical enclosure as claimed in claim 2, wherein the movable part is a flexible strip having one end fixed to the spool.

5. The optical enclosure as claimed in claim 2, wherein the enclosure further comprises a blocking element that can immobilize the connecting piece, when the connecting piece is in the position outside the radial continuation of the spool.

6. The optical enclosure as claimed in claim 1, wherein the enclosure further comprises a blocking element that can immobilize the connecting piece, when the connecting piece is in the storage position.

7. The optical enclosure as claimed in claim 6, wherein the blocking element comprises at least one abutment in the base, which can block the connecting piece in the storage position.

8. The optical enclosure as claimed in claim 6, wherein the blocking element comprises at least one abutment in the lid, blocking the connecting piece in the storage position when the lid covers the base.

9. The optical enclosure as claimed in claim 1, wherein the cable has a circular, oval or rectangular section.

10. A method of installing an optical enclosure, the enclosure comprising:

a base that can be fixed substantially parallel with a planar surface;

a spool arranged to rotate about a shaft which is substantially perpendicular to the base the spool extending radially from the shaft between a first plane and a second plane;

an optical cable wound in the spool;

a connecting piece, an inner side of which is connected, inside the enclosure, to a first end of the cable, called the internal end of the cable, an outer side of the connecting piece being intended to be connected to an external optical connection plug;

a removable lid that can cover the base and the spool;

the spool being rotatable on the shaft to enable the cable to be unwound out of the enclosure by pulling a second end of the cable, called the external end of the cable, the method comprising the following acts:

fixing the base on the planar surface;

positioning the connecting piece in a position outside a radial continuation of the spool which is defined between the first and second planes;

unwinding a length of cable by pulling the cable out of the enclosure by the external end of the cable;

after unwinding the cable, positioning the connecting piece in a storage position within the radial continuation of the spool, between the first and second planes, allowing the lid to cover the base and the spool;

fixing the lid on the base when the connecting piece is positioned in the storage position.

* * * * *

UNITED STATES PATENT AND TRADEMARK OFFICE
CERTIFICATE OF CORRECTION

| | |
|---|---|
| PATENT NO. | : 9,841,575 B2 |
| APPLICATION NO. | : 15/129711 |
| DATED | : December 12, 2017 |
| INVENTOR(S) | : Daniel Lecoq |

It is certified that error appears in the above-identified patent and that said Letters Patent is hereby corrected as shown below:

In the Claims

In Claim 10, Column 10, Line 2, insert --,-- after "base"

In Claim 10, Column 10, Line 19, insert --,-- after "spool"

Signed and Sealed this
Nineteenth Day of March, 2019

Andrei Iancu
*Director of the United States Patent and Trademark Office*